Aug. 8, 1939.　　　　F. E. FREGEAU　　　　2,168,520
RACK FOR FREEZING FISH

Filed Feb. 2, 1938

INVENTOR.
BY Frank E. Fregeau.
Geo. Stevens.
ATTORNEY.

Patented Aug. 8, 1939

2,168,520

UNITED STATES PATENT OFFICE 2,168,520

RACK FOR FREEZING FISH

Frank E. Fregeau, Duluth, Minn., assignor to Northern Cold Storage and Warehouse Company, Duluth, Minn., a corporation of Minnesota Application February 2, 1938, Serial No. 188,353

1 Claim. (Cl. 294—15)

This invention relates to racks, particularly adapted for use in freezing fish, the principal object being to produce as cheap, simple, and practical a rack for this purpose as possible.

Another object of the invention is to produce such a rack which may be practical for use in the freezing of fish in the open as well as within refrigerated rooms, or the like, and one which may be readily constructed by the fishermen themselves.

Other objects and advantages of the invention will appear in the following description thereof.

Referring now to the accompanying drawing, forming part of this application and wherein like reference characters indicate like parts:

Figure 1:
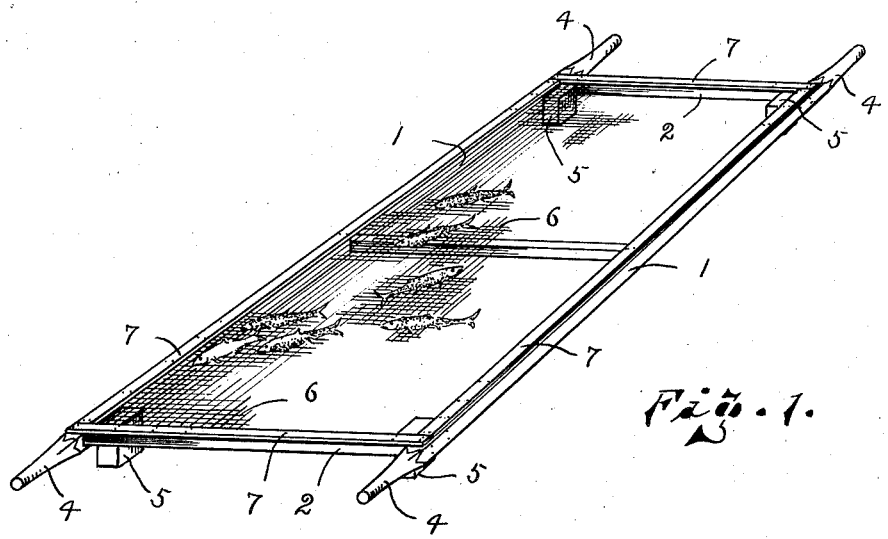
Figure 1 is a perspective view of one of the complete racks as now employed.
Figure 2:
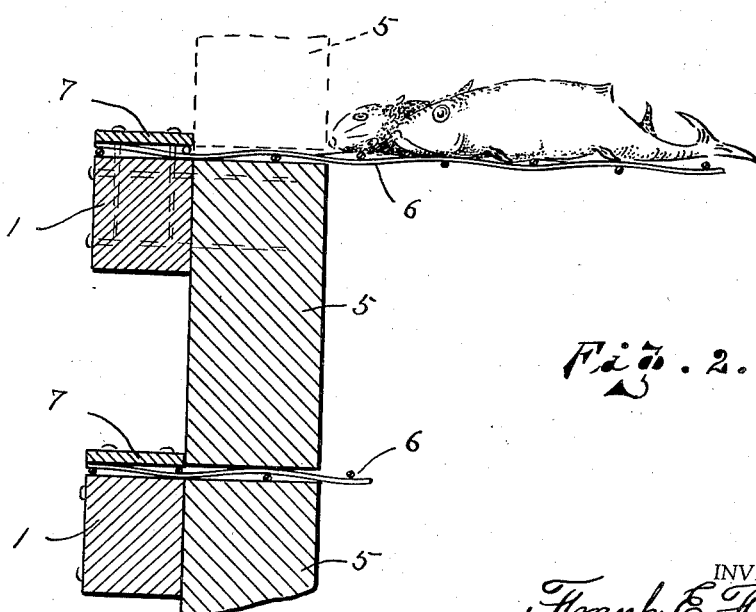
Figure 2 is an enlarged vertical sectional view transverse one side rail of the rack and centrally of one of the legs thereof.

The embodiment of rack here illustrated is that of one intended to be manipulated by two operators and consequently is provided with a pair of handles extending from either end thereof so that the racks when loaded or otherwise may be readily transported from place to place, and, for convenience and economy of space, they are designed to be superimposed one upon another, or stacked, either when loaded and during the process of freezing the fish, or stored away.

These racks are preferably of elongated rectangular form and composed of relatively small rectangularly shaped side members or rails 1, and similarly shaped end rails 2, suitably united in any desired manner, and preferably a similarly shaped central transverse reinforcing member 3. The side members or rails 1 extend considerably beyond the end members 2 and each is reduced in size and formed into a suitable handle portion 4 for the convenient manipulation of the rack. Within the four corners of the rack and inwardly of the end members 2 are securely fastened short pieces of preferably somewhat larger material, in practice these being of approximately 2 x 4 stock and relatively short, to provide legs 5 for the rack, they being nailed or otherwise fastened into position and with their uppermost ends flush with the upper surface of the side members. Then there is applied a suitably sized wire netting 6 wholly about the upper surface of the rack but not including the handles, and, wholly about the upper edges are securely fastened batten like strips 7, they being the full width of the end and side members and impinging between them and the battens the marginal surfaces of the netting 6. It is to be understood that the end members of the battens 7 overlap the side members 1, thereby adding strength to the structure, and with this object in view the battens are of relatively heavy and strong material.

It is to be noted that by such construction the lower end of the legs of one rack will rest upon the netting directly above the legs of the rack beneath the same when the racks are nested together either for the fish freezing operation, or when stored away, thus economising in space and yet providing ample room for air circulation, and the battens 7 forming guides for the lower end of the legs to insure uniformity in the stacking operation, and with the least possible stress coming directly upon the frames as the legs of one frame are directly above the legs of the frame immediately below it.

In the utilization of the device obviously the fish, such as herring or the like found in great quantities in the Great Lakes region and where many such are frozen during the early winter season, are placed usually rather promiscuously about on the wire portion of the rack and then the racks, thus loaded, are stacked as desired in the open or in refrigerated rooms for freezing. It is preferred by many customers in such trade that the fish be frozen as quickly as possible after removal from the nets, and, appearing in this loose frozen manner is deemed good evidence in the markets of the fish being thus treated.

While open mesh cloth or other material might be used as a support for the fish in such a rack, wire as shown is preferred both for its strength and durability as well as the fact that the markings of the wire left on the frozen fish are not objectionable.

Obviously these racks may be used by the fishermen themselves or by those engaged in the business of freezing fish in refrigerated rooms for the purpose.

Having thus described my invention, what I claim and desire to secure by Letters Patent, is:

A rack for fish comprising a series of rectangular frames, each having handles beyond the ends thereof, legs secured within the inner four corners of the frame having their upper ends below the upper edge of the frame and extending some distance below the lower edge of the frame, and an open wire netting secured within the frame below the upper edge and in a plane with the flat upper end of the legs and resting thereon, whereby a series of frames may be stacked, the lower ends of the legs of one frame resting upon the upper ends of the legs of the next frame below and held against lateral movement, forming a rack with a series of shelves supported in effect by four vertical corner posts inside the frames.

FRANK E. FREGEAU.